Patented Nov. 3, 1931

1,830,581

UNITED STATES PATENT OFFICE

LUDWIG WEISS, OF FRANKFORT-ON-THE-MAIN, GERMANY, ASSIGNOR TO DEUTSCHE GOLD & SILBER SCHEIDEANSTALT VORMALS ROESSLER, OF FRANKFORT-ON-THE-MAIN, GERMANY, A CORPORATION

PROCESS FOR THE MANUFACTURE OF OPACIFYING OXIDES

No Drawing. Application filed December 25, 1928, Serial No. 328,324, and in Germany December 27, 1927.

The invention relates to a process for the manufacture of opacifiers of high dispersion from tin, zirconium, and the like compounds.

Experiments for producing, for instance, highly dispersed tin or zirconium oxide by precipitating dissolved tin or zirconium compounds with suitable substances have hitherto not given satisfactory results.

I have now found that I can obtain highly dispersed products by converting soluble salts or compounds of these elements in a concentrated form into the corresponding oxides by means of suitable agents and heating the oxides thus formed to suitable temperature. By oxides I do not only mean the oxides themselves, but also the hydroxide or any other state of hydration. The concentrated form may, according to my invention, mean that I apply the respective tin or zirconium compound either in the form of its highest concentration e. g. in the solid state or, if the compound be liquid or vaporous by nature such as, for instance, tin chloride, in the liquid or vaporous state. I may also dissolve the compounds in small quantities of a dissolving liquor such as, for instance, water and apply them in the form of concentrated solutions. Suitable means for converting the tin or zirconium compounds into their oxides are, for instance, alkaline lyes, such as, for instance, caustic soda, ammonia and the like, also water, for instance, in the form of steam, preferably superheated steam.

In order to carry my invention into effect I mix for instance zirconium oxychloride in solid form with strong ammonia solution, for instance, with agitation. At first, granular zirconium hydroxide is formed which to my surprise is converted merely by heating into the finely distributed voluminous zirconium oxide desired. The temperatures to which the oxides formed have to be subjected are about 1000° centigrade and more, for instance, 1200 to 1500° centigrade.

Example I.—7.5 l. strong ammonia liquor (specific gravity 0.91) are poured on to 15 kgms. zirconium oxychloride with thorough agitation. After the conversion 3 to 5 liters of water are added to the mixture. The pasty mass is then distributed in about 100 liters of water. The precipitate settles very quickly. It is then freed from ammonium chloride by decantation with water. The deposit is filtered, dried and heated to a temperature of 1200 to 1400° C. Instead of applying the compounds in an undiluted form, I may utilize them if desired in the presence of limited quantities of dissolving liquids. Thus, they may be utilized, for instance, in the shape of highly concentrated or saturated solutions.

My invention can also be applied to vaporizable compounds of tin or zirconium. When doing so I have to adapt my process accordingly. In order to obtain the desired result I, for instance, react the vapors of zirconium tetrachloride with superheated steam and subsequently subject the hydrated oxide thus obtained to a heat treatment at suitable temperatures. In this case also the substance is advantageously heated to 1000° centigrade and more. In reacting the vaporous zirconium compound, for instance, with superheated steam, I carry out the reaction directly at high temperatures, for instance, at 600° centigrade and more.

I have found it useful to subject the product to the subsequent process of heating to temperatures of 1200° to 1400° centigrade or more, when manufacturing opacifiers immediately after the compounds have been converted into the respective oxides. The heating of the oxides, however, can also be effected later.

Example II.—Stannic chloride $SnCl_4$ with a boiling point of 112° C. is vaporized and the vapours heated in a porcelain tube to about 300° C. The vapours are then brought in contact with superheated steam whereupon reaction takes place. The precipitate is washed with water until free of hydrochloric acid, filtered and dried. It is then ignited at a temperature of a little over 900° C. The opacifiers produced according to my invention yield excellent enamels which are quite uniformly cloudy, and show a great resistance against vitrification and dissolution by the fused enamel melt.

What I claim is:

1. A process for the manufacture of opacifying oxides which consists in reacting the vapor of a water soluble compound of the group of elements consisting of zirconium and tin with a hydrating substance and heatign the product formed.

2. A process for the manufacture of opacifying oxides which consists in reacting the vapor of a water soluble compound of the group of elements consisting of zirconium and tin with a hydrating substance and heating the product formed at a temperature above 900° C.

3. A process for the manufacture of opacifying oxides which consists in reacting the vapor of a water soluble compound of the group of elements consisting of zirconium and tin with a hydrating substance and heating the product formed at a temperature between about 900°–1500° C.

4. A process for the manufacture of opacifying oxides which consists in reacting the vapor of a water soluble compound of the group of elements consisting of zirconium and tin with superheated steam and heating the product formed.

5. A process for the manufacture of opacifying oxides which consists in reacting the vapor of a water soluble compound of the group of elements consisting of zirconium and tin with superheated steam and heating the product formed at a temperature above 900° C.

6. A process for the manufacture of opacifying oxides which consists in reacting the vapor of a water soluble compound of the group of elements consisting of zirconium and tin with superheated steam and heating the product formed at a temperature between about 900°–1500° C.

7. A process for the manufacture of opacifying tin oxide which consists in reacting stannic chloride vapors with a hydrating substance and heating the product formed.

8. A process for the manufacture of an opacifier which consists in reacting stannic chloride vapors with superheated steam and heating the product formed at a temperature above 900° C.

9. A process for the manufacture of a tin oxide opacifier which consists in reacting stannic chloride vapors with superheated steam and heating the product formed at a temperature between about 900° C. and 1500° C.

Signed at Frankfort-on-the-Main, in the country of Hessen-Nassau and State of Prussia, Germany, this 10th day of December, A. D. 1928.

LUDWIG WEISS.